US011231987B1

(12) United States Patent
Bose et al.

(10) Patent No.: US 11,231,987 B1
(45) Date of Patent: Jan. 25, 2022

(54) DEBUGGING OF MEMORY OPERATIONS

(71) Applicant: Amazon Technologies, Inc., Reno, NV (US)

(72) Inventors: Benita Bose, Sunnyvale, CA (US); Ron Diamant, Santa Clara, CA (US); Georgy Zorik Machulsky, San Jose, CA (US); Alex Levin, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 129 days.

(21) Appl. No.: 16/456,256

(22) Filed: Jun. 28, 2019

(51) Int. Cl.
| G06F 11/30 | (2006.01) |
| G06F 11/07 | (2006.01) |
| G06F 11/32 | (2006.01) |
| G06F 13/28 | (2006.01) |
| G06F 15/78 | (2006.01) |
| G06F 11/34 | (2006.01) |

(52) U.S. Cl.
CPC ...... *G06F 11/0793* (2013.01); *G06F 11/3034* (2013.01); *G06F 11/323* (2013.01); *G06F 11/327* (2013.01); *G06F 11/3466* (2013.01); *G06F 13/28* (2013.01); *G06F 15/7807* (2013.01)

(58) Field of Classification Search
CPC .... G06F 13/28; G06F 11/0793; G06F 11/323; G06F 11/327; G06F 11/34; G06F 11/3466; G06F 11/3476; G06F 11/3485; G06F 11/348; G06F 11/30; G06F 11/3037
See application file for complete search history.

(56) References Cited

U.S. PATENT DOCUMENTS

| 6,920,586 | B1* | 7/2005 | Moyer | G06F 11/3485 710/22 |
| 7,191,257 | B2* | 3/2007 | Ali Khan | G06F 13/28 702/190 |
| 8,160,084 | B2* | 4/2012 | Lindvall | G06F 9/546 370/412 |
| 9,419,621 | B1* | 8/2016 | Rohleder | G06F 11/34 |
| 9,875,167 | B1* | 1/2018 | Norrie | G06F 9/542 |
| 2006/0259825 | A1* | 11/2006 | Cruickshank | G06F 11/3636 714/38.1 |
| 2011/0264830 | A1* | 10/2011 | Arena | G06F 11/349 710/22 |

(Continued)

*Primary Examiner* — Yolanda L Wilson
(74) *Attorney, Agent, or Firm* — Hogan Lovells US LLP

(57) ABSTRACT

A debugging tool, such as may take the form of a software daemon running in the background, can provide for the monitoring of utilization of access mechanisms, such as Direct Memory Access (DMA) mechanisms, for purposes such as debugging and performance improvement. Debugging tools can obtain and provide DMA utilization data, as may include statistics, graphs, predictive analytics, or other such information. The data can help to pinpoint issues that have arisen, or may arise, in the system, and take appropriate remedial or preventative action. Data from related DMAs can be aggregated intelligently, helping to identify bottlenecks where the individual DMA data might not. A debugging tool can store state information as snapshots, which may be beneficial if the system is in a state where current data is not accessible. The statistics and predictive analytics can also be leveraged to optimize system-performance.

20 Claims, 9 Drawing Sheets

(56) References Cited

U.S. PATENT DOCUMENTS

| | | | | |
|---|---|---|---|---|
| 2015/0006970 A1* | 1/2015 | Hanssen | ............. | G06F 11/2221 |
| | | | | 714/45 |
| 2015/0058596 A1* | 2/2015 | King | ................... | G06F 12/1081 |
| | | | | 711/206 |
| 2015/0089011 A1* | 3/2015 | Alanis | ................. | G06F 11/0778 |
| | | | | 709/212 |
| 2015/0127994 A1* | 5/2015 | Sankar | ................ | G06F 11/3636 |
| | | | | 714/45 |
| 2016/0203091 A1* | 7/2016 | Lee | ....................... | G06F 3/0658 |
| | | | | 710/105 |
| 2017/0193055 A1* | 7/2017 | Harn | .................... | H04L 41/145 |

* cited by examiner

DEBUGGING OF MEMORY OPERATIONS

BACKGROUND

Various computing devices that include one or more processors can utilize approaches such as direct memory access (DMA) to provide access to data without involving at least one of these processors, so as to not occupy a portion of the processing capacity for access operations. The wide use of access technologies such as DMA makes it a point of focus for hardware troubleshooting, but debugging the DMA can be a complicated process for a number of reasons such as those discussed herein.

BRIEF DESCRIPTION OF THE DRAWINGS

Various embodiments in accordance with the present disclosure will be described with reference to the drawings, in which.

DETAILED DESCRIPTION

Approaches in accordance with various embodiments provide for the monitoring of memory operations of a computing system. In particular, various embodiments provide for the monitoring of utilization of access mechanisms, such as Direct Memory Access (DMA) mechanisms, for purposes such as debugging and performance improvement. In some embodiments, a host machine may utilize various hardware units, with the interfaces to these hardware units being DMA interfaces. In order to help troubleshoot issues with the system, approaches in accordance with various embodiments can provide tools that can obtain and provide DMA utilization data, as may include statistics, graphs, predictive analytics, or other such information. The data can help to pinpoint issues that have arisen, or may arise, in the system, and take appropriate remedial or preventative action. In some embodiments, a debugging tool such as a software daemon can be running on a host machine and can access DMA utilization data for various DMA engines, controllers, or other such components ("DMAs"), such that data from related DMAs can be aggregated intelligently. Such aggregation can help to pinpoint hot spots or bottlenecks that might not otherwise be apparent from the individual DMA data. Further, such a tool can store state information as snapshots, which can help provide debugging data if the system is in a state where current data is not accessible. The statistics and predictive analytics can also be leveraged in some embodiments to optimize system-performance.

The ability to obtain information about hot spots and bottlenecks can help to more quickly identify and remedy system issues, which can minimize system downtime. Such approaches can also be used to more evenly distribute load across a system, which can significantly improve system performance and reduce downtime. The ability to quickly obtain such information can also reduce the amount of time and computing resources needed to identify and manage such issues using conventional approaches.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Various other functions can be implemented within the various embodiments as well as discussed and suggested elsewhere herein.

Figure 1:
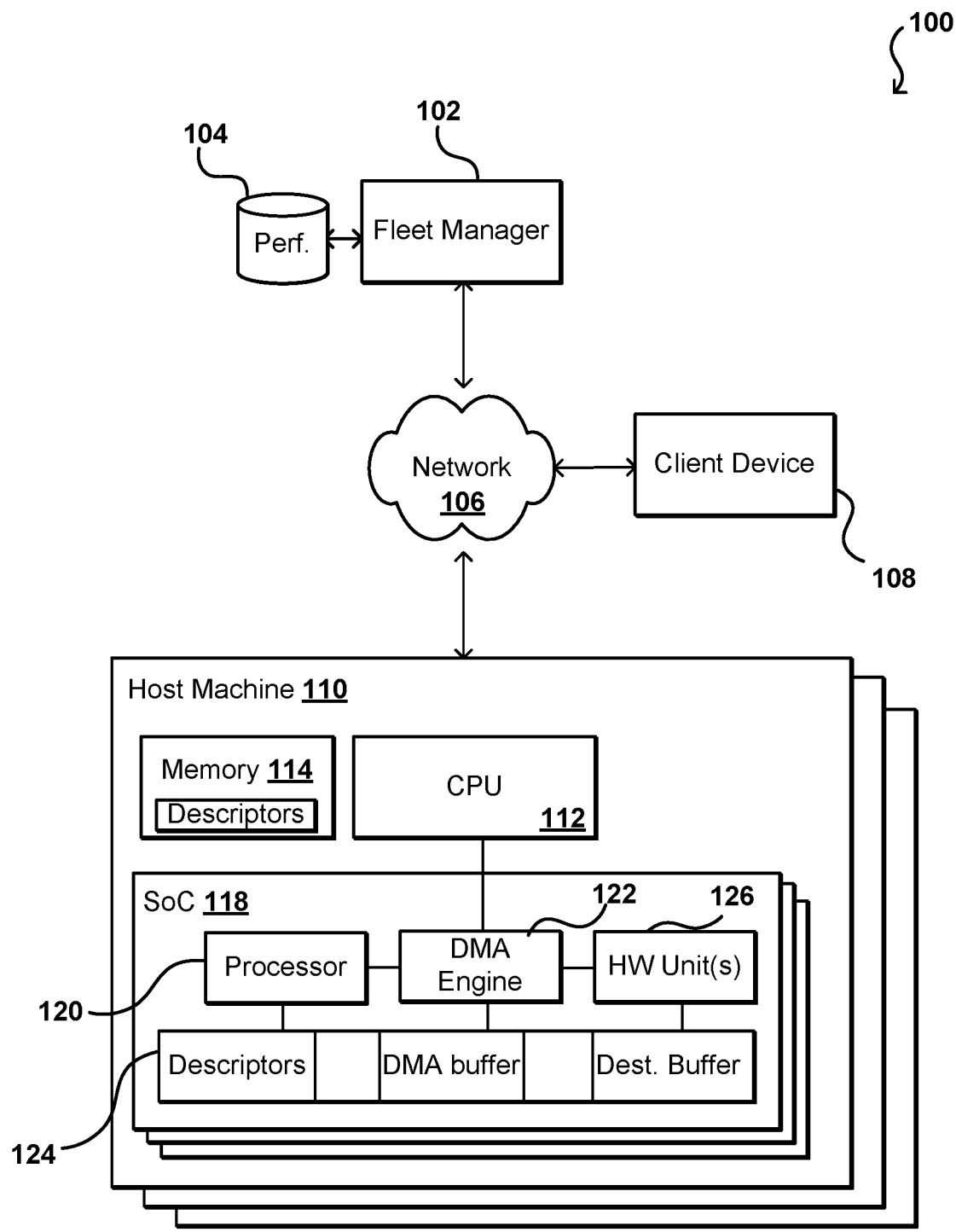
FIG. 1 illustrates components of an example computing system that can be utilized in accordance with various embodiments.

FIG. 1 illustrates an example computing system 100 in which aspects of various embodiments can be implemented. As illustrated, this system may comprise a distributed system including computing devices that may be in different locations and provided or operated by multiple entities in at least some embodiments. In this example, the distributed system make take the form of a data center or server farm, for example, where a fleet manager 102 (which may be a system, device, service, or process, etc.) may be responsible for monitoring and/or managing various aspects of a set of host machines 110, such as servers, in a computing resource environment. In such an environment, a user might be able to utilize a client device 108 to access one or more of the host machines 110 across at least one network 106, such as the Internet or a cellular network, among other such options.

In this example, a computing device such as a server or host machine 110 will include at least one central processing unit (CPU) 112 or other such processor (e.g., a graphics processing unit (GPU)). Different servers may have different numbers of processors of one or more types. As known in the computing arts, a CPU can include electronic circuitry that can be used to execute instructions of one or more computing programs by performing basic operations specified by the instructions. Each host machine may also include a device memory 114, such as DRAM, for storing data, as well as one or more input/output components, which can allow data and instructions to be passed to, and from, the processor and other components of the respective host machine.

In some embodiments, each server may include one or more subsystems, as may take the form of a system on chip (SoC) device. A system on chip can take the form of an integrated circuit, or chip, that includes components of a computing device and thus can function, at least in part, as a separate computing device within a host machine 110. As illustrated, a host machine 110 in accordance with various embodiments can include one or more SoCs 118, which can each include components such as at least one general purpose processor 120 and physical memory 124. A SoC can include other components as well, such as one or more offloading engines, GPUs, and the like. An example SoC can also include at least one DMA unit, such as a DMA engine 122, or DMA controller, that can be used to generate memory addresses and initiate memory read or write cycles in order to move or access data on the SoC 118 without involving the processor 120 on the SoC 118 or the CPU 112 on the host device, such that these processors can use their capacity for other tasks. In an example flow in accordance with at least one embodiment, the processor 120 can configure the DMA engine 122 using a descriptor, command, or other type of data or metadata, for example, and the DMA engine can begin operating as a standalone entity. The DMA engine 122 can also be any of a number of types of DMA engines, such as engines that copy data from host memory 114 to host memory or from host memory 114 to SoC memory 124, among other such options. Another DMA device might take data from the host memory 114 and bring it to a hardware unit, not necessarily to memory.

In one embodiment, a processor-side device driver can create a descriptor for a DMA buffer and allocate the buffer in memory 124. As illustrated in FIG. 1, however, descriptors (used to describe source and destination for data movement by the DMA engine) can be stored in other locations as well, such as in memory 114 on a host machine 110. The device driver can initialize the descriptor with the information for the DMA buffer, such as the size, start address, and status. The device driver can inform the DMA engine 122 of the start address for the descriptor, such that the DMA engine 122 can load the relevant content from memory. The DMA engine can receive data from an I/O device, for example, and can write the data to the allocated DMA buffer. The owner states of the descriptor can then be modified to point to the DMA engine 122. The DMA engine can send an interrupt to the processor 120 to indicate that the receiving operation is complete. The device driver can then handle the interrupt raised by the DMA engine, and can copy the received I/O data from the DMA buffer to the destination buffer, after which the DMA buffer can be released.

In an SoC hardware design in accordance with some embodiments, each engine or offloading unit has one or more associated DMAs. The DMAs are responsible for moving data into a hardware accelerator for the performance of a specific operation (e.g. compression, serialization, hashing, etc.) and then directing the result to a non-transitory medium of storage, such as a DRAM or SRAM. As mentioned, the widespread use of an access technology such as DMA results in it being a point of focus for troubleshooting hardware problems. Many problems on a device such as a host machine 110 will probably involve the DMA. For example, if the Ethernet unit stops working then the troubleshooting will focus, among other locations, at the relevant DMA block moving data into, and out of, the Ethernet controller.

As mentioned, debugging the DMA can be very complex. Often being a low-level interface to various hardware units, the DMA has a unit specific error indication that may cause the DMA to function incorrectly. Further, since the DMA can be configured by an application or software, it is also open to misconfiguration errors and various misuses, as may relate to descriptor corruption or incorrect instance configurations, among others. Since the DMA lies between the hardware and the CPU in various embodiments, there could be errors due to mis-programming the DMA from the CPU side, or there could be hardware errors in the accelerator that is causing the DMA to fail. To debug the DMA using conventional approaches, one has to understand the intrinsic workings and details of the DMA itself to get to the debug process.

One issue relates to the debug process itself. In conventional approaches, there are intrinsic data structures that have to be accessed. This access can become difficult if there is a system failure, such as where the DMA attempted to access restricted memory and the system has frozen. In this case, accessing these structures and following the process of the DMA may not be an option. Another issue can relate to the situation where, for example, the DMA has encountered a bad descriptor, etc., but has made progress since. Reading the registers from the intrinsic data structures using a conventional approach will not point to the problem of failure since the system state has changed due to the progress since the error. Conventional approaches also do not provide a tool that is able to monitor DMA utilization, which limits the ability to perform adjustments such as load balancing across the various DMAs in a system, based on information such as bandwidth and the like.

Accordingly, approaches in accordance with various embodiments provide mechanisms for obtaining data in ways that improve the ability to debug DMA, particularly on a deployed chip, which can be particularly suitable for a data center, multi-tenant, or shared resource environment. In one embodiment, a software program such as a specialized software daemon can periodically contact the DMA and associated hardware unit for data, in order to obtain a current snapshot of the relevant configuration. A DMA debugger daemon or other such DMA debugger tools can run continuously in the background in some embodiments, gathering information on the DMA on a regular basis. The information can be stored such that if there is a system failure and current data is not accessible that would help with the debug process, the known past state can be determined from the stored snapshots. A developer or debugger could go back in time to determine the DMA states, the registers where the descriptors were, etc., which can help provide at least a starting point for the debugging process. The program can also interact with logic, such as may execute on a remote device such as the fleet manager 102, that will parse the data to make intelligent decisions with respect to possible error cases.

For example, example logic in accordance with one embodiment can identify a problematic DMA unit of a deployed host machine when that DMA unit returns the same exact state. Even though no error is generated, there is a reasonable expectation in many systems that the system will perform data operations using the DMA, which will cause the state to continually change or update. Further, the logic might detect a periodic warning that, in and of itself, may not be sufficient to determine a problem, but if recurring may indicate a hardware and/or software error that might hurt stability or performance. The software program can also, upon request or instruction, traverse through the various descriptors in the DMA, whether outstanding or in-flight, to enable the user or the remote logic to analyze the integrity. The software program in this example can also retrieve, from the remote logic, the latest decision-making model for assisting with onsite and/or local debugging. For example, the way in which DMA pointers are parsed can differ from one processor core to another based at least in part upon memory topology changes (e.g., NUMA), as well as upon memory types that can, or cannot, utilize DMA, as well as memory types that are coherent or non-coherent, among other such options. An example software program can also provide any user, local or remote to the host machine, with an interactive way of traversing the data. Typically a system has a number of DMA units and each DMA unit has a number of queues. Each queue can have one or more descriptors that can be stored to local memory 124 in some embodiments.

In various embodiments, an SoC 118 on a host machine can include a number of dedicated hardware units that are used to accelerate specific functionalities. For instance, an example SoC could have one or more additional hardware units used for tasks relating to compression, encryption, hashing, or authentication, among other such options. As mentioned, a DMA engine 122 can efficiently offload this work by moving the between the CPU 122 and the hardware unit(s) 126. The DMA, when programmed correctly, can manage the moving of information between the CPU 120 and the hardware units 126, thus freeing the CPU 120 to perform other tasks. Typically, each hardware block has one or more DMA units 126 dedicated for this cause. As mentioned, since the DMA is a liaison between the hardware block and the CPU, it could have errors due to a variety of reasons ranging from the low-level faults in the associated hardware unit, to an application level misconfiguration of the DMA, etc. The hardware units can include components such as an Internet controller, encryption engine, compression engine, and the like.

Approaches in accordance with various embodiments can assist with the debugging of a system experiencing some type of error or failure. This can include, for example, investigating DMA failures or studying DMA progress that involves accessing of internal data structures from the SoC 118. DMA errors can become difficult to debug when, for example, the DMA tries accessing restricted areas (e.g., an unauthorized memory address), causing the system fabric to be stuck and resulting in an entire system failure. In such a scenario, accessing the internal data structures to debug the DMA becomes an issue. DMA errors can also be difficult to debug when the DMA has encountered a bad descriptor or similar issue but the system has progressed since then. In this case the current DMA related data structures would not point to information leading to the failure and would have advanced. Conventional approaches also do not provide a direct means of monitoring DMA activity. Monitoring DMA utilization in at least some embodiments can provide insight into memory utilization and enable the software applications using the DMA to make better calculated DMA usage and load balancing decisions.

Figure 2A:
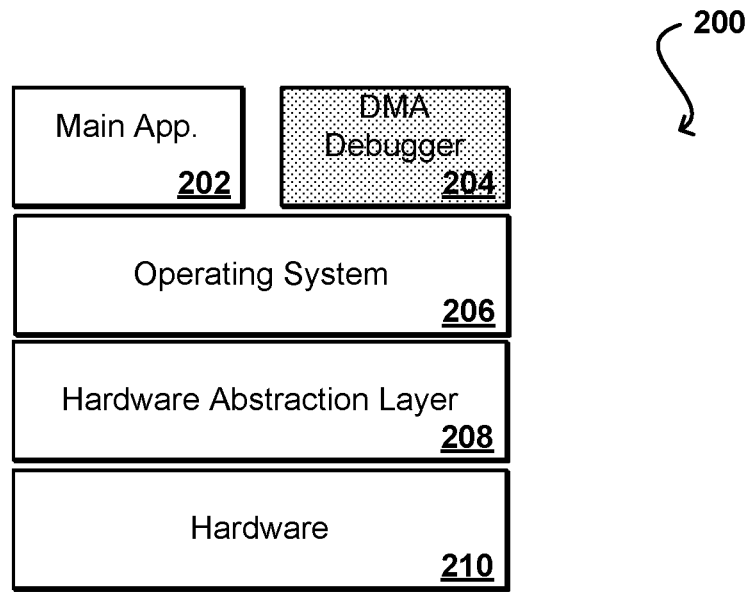
FIGS. 2A and 2B illustrate example stacks for computing devices that can be utilized in accordance with various embodiments.

A DMA tool in accordance with various embodiments can be deployed as a software daemon, as mentioned above, which can execute as a background process that can gather DMA-related information on a regular, periodic, or ad hoc basis. FIG. 2A illustrates an example computer system stack 200 that can be utilized in accordance with various embodiments. In this example, the operating system (OS) 206 operates on top of a hardware extraction layer 208, which in turn operates on top of the device hardware 210. A main application 202 (as well as potentially other applications) can run on top of the OS 206, while the DMA debugger 204 (such as may be in the form of a software daemon) can run as a background process.

It may be the case that a misconfiguration of the DMA will cause the DMA to hang or experience another such issue, which can cause the entire system to enter a bad state since at least certain data cannot be moved without the DMA. As a consequence, it is not always possible to inspect the DMA state after a system failure. Accordingly, a DMA debugger program (e.g., daemon) can periodically reads the DMA state, which can include information relating to specific hardware registers, DMA descriptors, and the like, and logs the DMA state to a file. The storage of this state information can help to maintain the last known state of the DMA. If the system freezes, that file can be inspected for potential DMA misconfigurations.

In one example, a DMA programming error might result from the DMA transmission descriptors being programmed but not the DMA receive descriptors. The DMA could initiate a copy operation that would then stall since the DMA is waiting for the receive descriptors. This could eventually result in a timeout-induced failure in at least some embodiments, and could result in an abort case and an eventual system failure. A DMA debugger program in accordance with various embodiments can use the snapshots captured prior to the timeout to show that the DMA receive submission side tail pointers, or producer pointers, have not progressed, while the transmit side pointers may all be intact. This information, particularly when combined with the tool error parsing feature, can facilitate failure debugging. Similarly, an example DMA debugger program could be used to provide details on other internal hardware errors that may lead to, or help result in, the DMA failure.

Figure 2B:
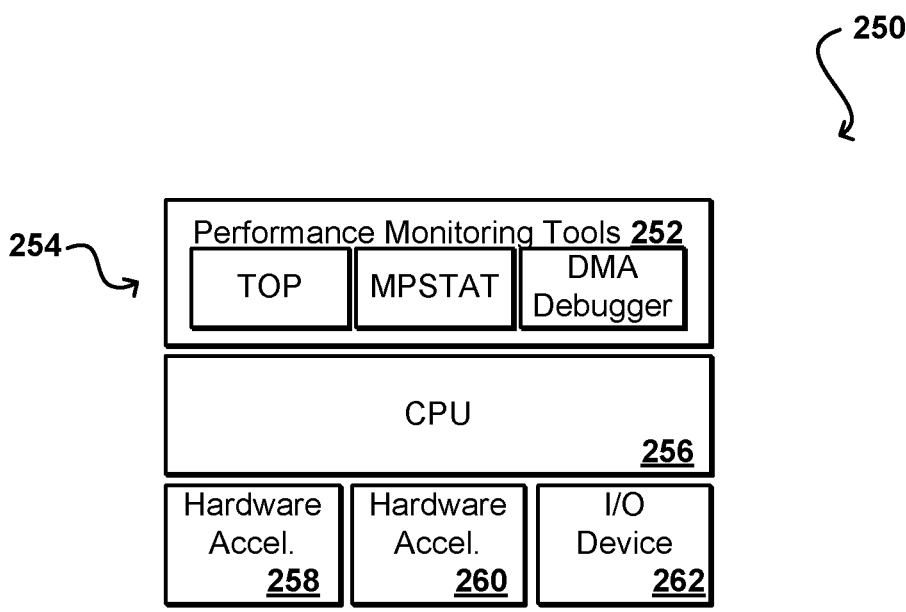

In at least some embodiments, a DMA debugger program can help simplify the details of the internals of the DMA, and can provide a user of the tool with a view of the overall, high-level health of the DMA. A user in some embodiments can invoke the DMA debugger to obtain a view of DMA utilization, similar to how the system might utilize the MPSTAT performance monitoring tool 254 to obtain data about CPU utilization. As illustrated in the example stack 250 of FIG. 2B, performance monitoring tools 252 can sit on top of the CPU layer 256, where the tool layer can include individual tools such as TOP, MPSTAT, and a DMA debugger daemon, as discussed herein. The CPU layer can sit on one or more hardware accelerators 258, 260 or I/O devices 262 as well, as discussed and suggested herein. The I/O devices may include, for example, disk controllers or network controllers, among other such options. Monitoring tools such as MPSTAT, TOP, PERF, and others can provide information about the CPU-level utilizations, which can help in development of applications that can take these attributes into account and maximize efficiency. For example, MPSTAT typically provides the average CPU utilization since startup unless an interval is specified, in which case the tool can provide the average CPU utilization over that interval. Other tools can provide other metrics such as maximum value, range of utilization values, etc.

Figure 3A:
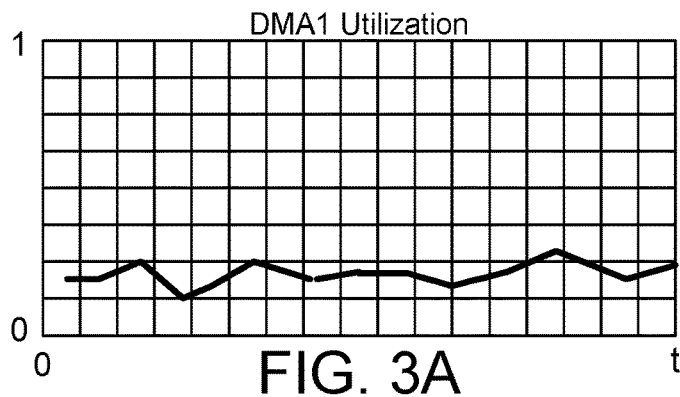
FIGS. 3A, 3B, 3C, 3D, 3E, and 3F illustrate example plots of utilization that can be generated in accordance with various embodiments.
Figure 3B:
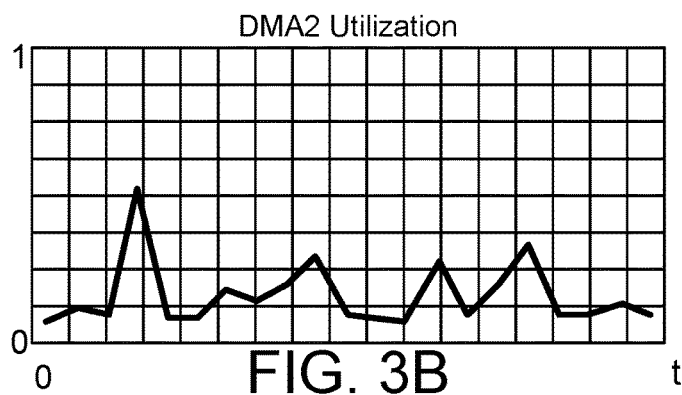
Figure 3C:
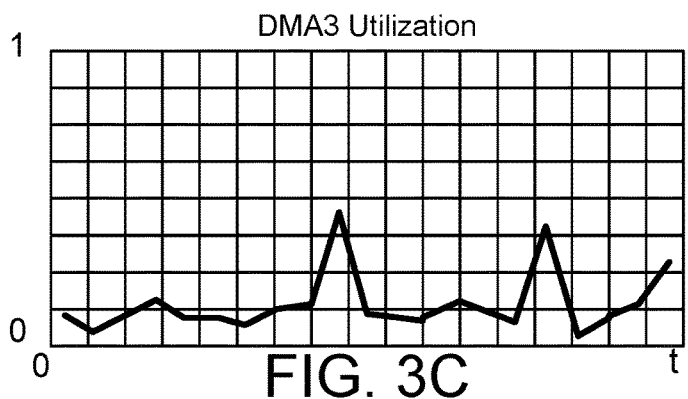
Figure 3D:
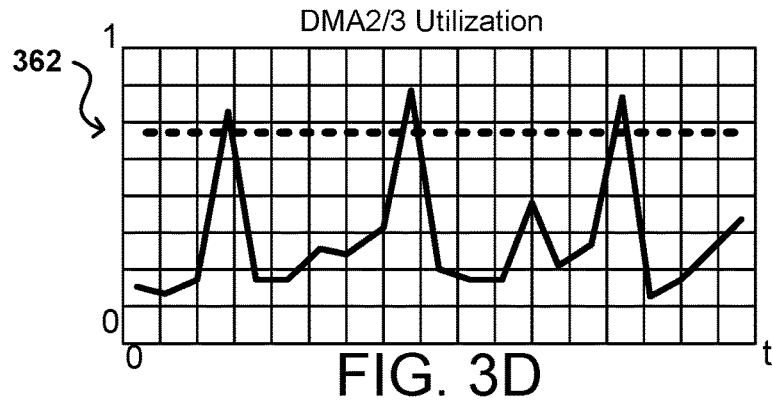

FIGS. 3A through 3D illustrate example plots of data that can be obtained or generated using a DMA debugger daemon or other such DMA debugger program in accordance with various embodiments. FIG. 3A illustrates a first DMA utilization 300, FIG. 3B illustrates a second DMA utilization 320, and FIG. 3C illustrates a third DMA utilization 340 over the same period of time, as may be measured in seconds or other such measures. The DMA debugger daemon can provide information about each DMA over the period of time, as may relate to the average, range, max, etc. In one example, a hardware accelerator might have two DMAs, in this instance corresponding to the second DMA plot 320 and the third DMA plot 340. When viewed individually, each of these plots may demonstrate acceptable performance. A DMA debugger program in accordance with various embodiments can also analyze the data in aggregate, in order to provide a more complete picture of DMA performance. In this example, the DMA debugger program can aggregate the data, which can be used to generate the plot 360 of FIG. 3D. In this example it can be seen that when the DMAs for the hardware accelerator over the period are viewed in aggregate, the utilization peaks exceed a maximum utilization threshold 362. The presence and/or timing of these peaks would not have been readily available without such a DMA debugger program. When an application developer (or other such person or entity) has this type of insight about DMA utilization, the developer can stagger or balance the load across the relevant DMAs in order to more evenly distribute the DMA utilization over time, such that the utilization does not reach or exceed the maximum utilization threshold. As illustrated, the individual utilizations for the DMAs are acceptable, but in aggregate there can be a memory and/or bandwidth issue due to the DMA being overburdened. In some embodiments, the software can utilize information from a DMA debugger daemon to automatically adjust the load based at least in part upon this information, in order to automatically maintain DMA utilization at an acceptable rate. In other embodiments, suggestions might be made that can be enacted by a user through a console or other user interface as well, among other such possible remedial actions. In some embodiments the remedial action to take may depend in part upon rules or policies put in place, or upon the extent of the problem. For example, if there is a significant system failure, or the utilization excess greatly exceeds the threshold value, then the system might automatically take remedial action in order to attempt to keep the system from crashing or potentially losing data. For less severe situations, the tool might provide recommendations or alerts, or even just provide data, statistics, and/or plots, among other such options For example, the tool could automatically stagger DMA2 and DMA3 usage such that the total DMA utilization for the respective hardware accelerator does not result in a memory hotspot at any given time. Since each DMA may be competing for at least some of the same system memory access in various embodiments, such an approach can provide valuable insight into better bandwidth utilization and efficient DMA load balancing. A programmer could load balance and use the available DMAs in a hardware block more efficiently to improve system performance.

Figure 3E:
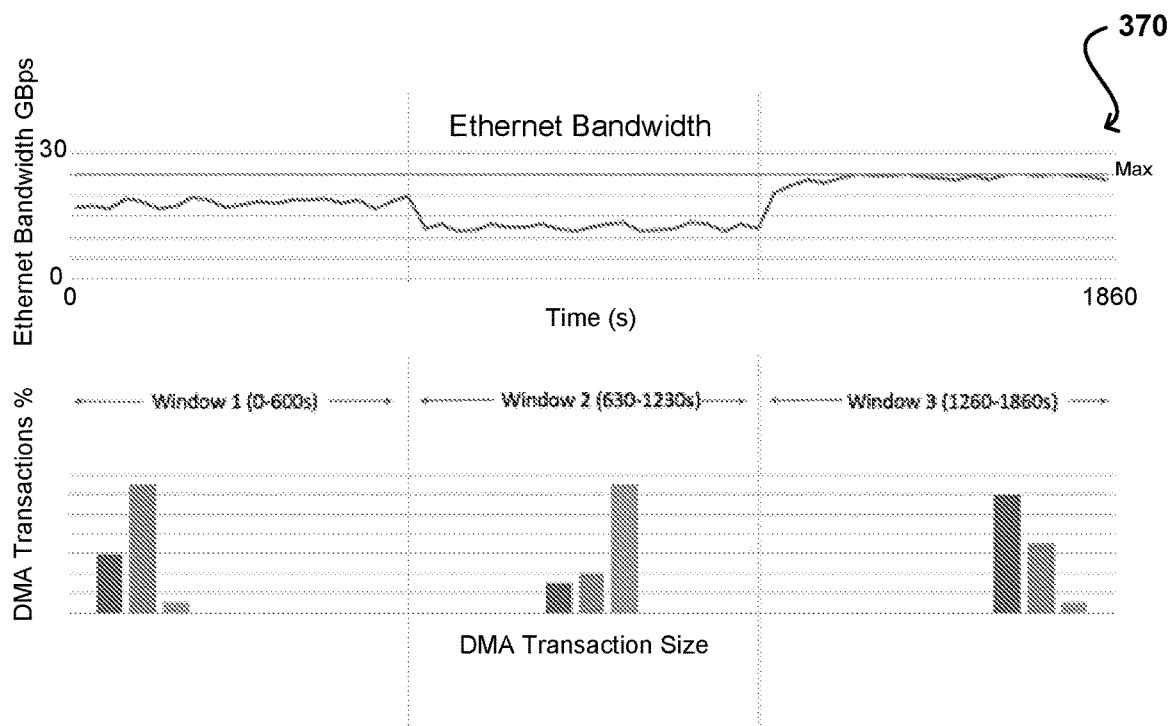
Figure 3F:
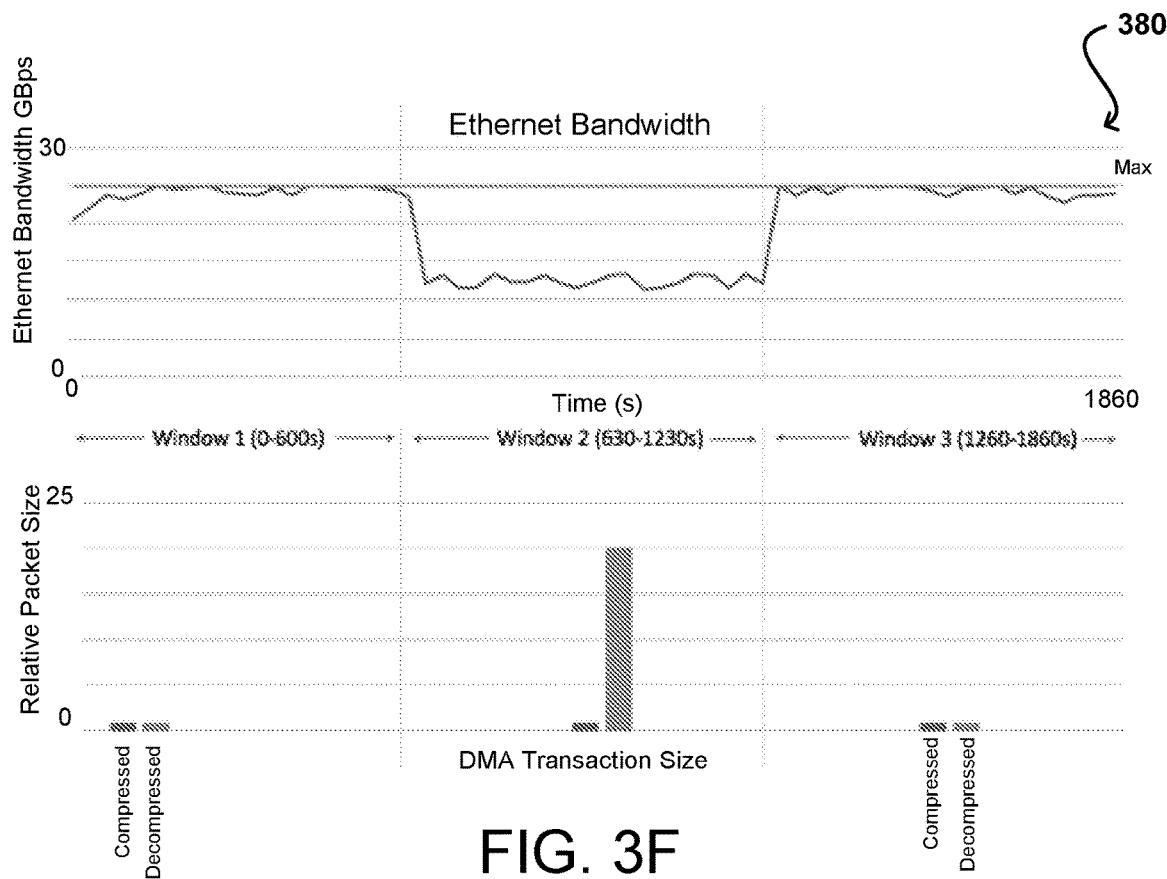

FIGS. 3E and 3F illustrate additional plots that can be generated in accordance with at least one embodiment. The plot 370 of FIG. 3E illustrates an effect of DMA transaction size on Ethernet bandwidth. It can be seen that during a time period of Window 2 that Ethernet bandwidth (in GBPs) was significantly lower than for Windows 1 and 3. It can also be seen from this plot that Window 2 had the highest percentage of small transactions (less than 64 bytes) while Window 1 had the highest percentage of medium size transactions (64B to 256B) and Window 3 had the highest percentage of large transactions (greater than 256B). It can therefore be determined that for Window 3 where Ethernet bandwidth reached a maximum value threshold, this was due at least in part (or at least correlated with) a period of large transactions. The plot 380 of FIG. 3F illustrates an effect of compression and decompression on Ethernet bandwidth. In this example, Window 2 again had the lowest Ethernet bandwidth utilization, which is associated with a period of large decompressed packet sizes. Windows 1 and 3 both hit a maximum utilization threshold value, and were associated with periods when the compressed and decompressed packets sizes were about the same size. This correlation between compressed and decompressed packet size can be used to help diagnose the issues with high utilization in Windows 1 and 3, and remedial action in some embodiments can attempt to modify the relative packet sizes of decompressed packets to compressed packets, among other such options.

In various embodiments, a DMA debugger tool can analyze the system from a holistic perspective, in addition to gathering relevant information and performing statistical analysis. A DMA dehugger tool in some embodiments can run on each and every DMA in the system. In one example, there might be separate DMAs for the various hardware tools, such as one for the encryption engine, one for the compression engine, and a third one for a storage engine. The storage engine can read from the host machine, and writes into a storage device. The encryption engine can read from memory and write to memory, as does the compression engine. The tool can create data analytics, statistics, and/or graphs for each of the DMAs, and can do aggregations or other such analyses. The tool can take or recommend an appropriate remedial action as discussed herein.

A DMA debugger tool in accordance with various embodiments will also have an understanding of the entire system. In one embodiment, the DMA debugger tool will have access to data indicating which portion of the memory map is mapped to a local device DRAM, and which portion of the memory map is mapped to the host PCI, for example, or to a local SSD. A set of aggregation maps can then be generated, or aggregated data or statistics generated, that only aggregate the bandwidth from DMAs that are reading and writing from this same target. For example, compression and encryption engines can consume the same bandwidth since they read and write from the same memory, such as the local device DRAM. A storage controller might read from the host memory and thus consume different bandwidth, such as PCI bandwidth, such that aggregation may not make as much sense. The understanding of the overall system, including which portions of the address map target the same memory location, enables a DMA debugger tools to aggregate utilization information only as needed, using intelligence based on the mapping. In some embodiments the software tool can take information that is encoded by the respective chip (as may relate to head and tail pointers in specific registers or a circular command buffer, etc.) and parse the information to obtain the utilization and other such data. A tool in accordance with some embodiments may also provide an interconnect map with bandwidth and latency information across each link, indicating the location of identified bottlenecks.

An example programming error can relate to the fact that DMA in some embodiments needs to be told where to get, and put, data for an operation. A simple error might result from a programmer not correctly configuring the receive-side descriptor, such that only the transmit side descriptors are programmed. When the DMA starts copying data, there will be no specified location to which to store the data because the receive-side buffers are not programmed correctly. There could be a timeout, which might result in an abort or eventually a system failure. Information can be provided through an example DMA debugger tool in accordance with various embodiments which would provide the information needed to identify this problem, as it can be determined that the receive descriptors have made no progress so there is a problem relating to the receive side. As mentioned, such a DMA debugger tool could run on the same SoC as the DMA, or could run on the host machine in various embodiments. As mentioned, such a tool can also help to monitor and analyzed DMA utilization and use that information to recommend or take remedial, or preventative, actions in at least some embodiments.

Referring back to FIG. 1, a DMA debugger daemon will run locally to an SoC 118 in at least some embodiments. In some embodiments, the data from the DMA debugger tools can be provided to a fleet manager 102 or other such device or entity for analysis. The fleet manager can then analyze data for all machines across the fleet, and store performance data to a local repository 104 for further analysis. Such an approach can help to identify common problems across the fleet, and may enable taking a fleet-wide remedial or preventative action based at least in part upon this data. Such an approach can help improve fleet-wide health monitoring and maintenance. A client device 108 can also then access the performance data in some embodiments, such as where a customer or provider might want to obtain information about the performance of one or more resources, or types of resources, across a fleet or set of resources. The ability to obtain data from multiple machines also allows for a further aggregation, which can help to identify hotspots, bottlenecks, or other potential issues across the fleet. Such data can also provide a training dataset that can be used with machine learning in some embodiments, which can help to predict or infer future bottlenecks or hot spots and take, or recommend, preventative action.

In some embodiments the DMA can be treated as a sequence of commands to be executed, which are stored in a circular buffer. The data that is stored can include source and destination information, buffer size information, and information about what is to be done with that data. An example operation might be to take 4 kb of data from address X, encrypt the data using a key specified in the command, and write the encrypted data as 4 kb of data to address Y. There can be two pointers, including a tail pointer that indicates the location where the software will submit the next instruction, and a head pointer indication the next command that the DMA will execute. The addresses have meaning, such that they can be mapped to various types of memory (e.g., CPU memory or DRAM). Each of these interfaces can have a certain amount of supported bandwidth, say 20 gb/s, half duplex for either reads or writes. The head pointers in all the command lists and/or circular buffers can be monitored in some embodiments, over at least a window of time of execution for the DMA. This data can then be analyzed or used to generate appropriate graphs or statistics in at least some embodiments.

Figure 4A:
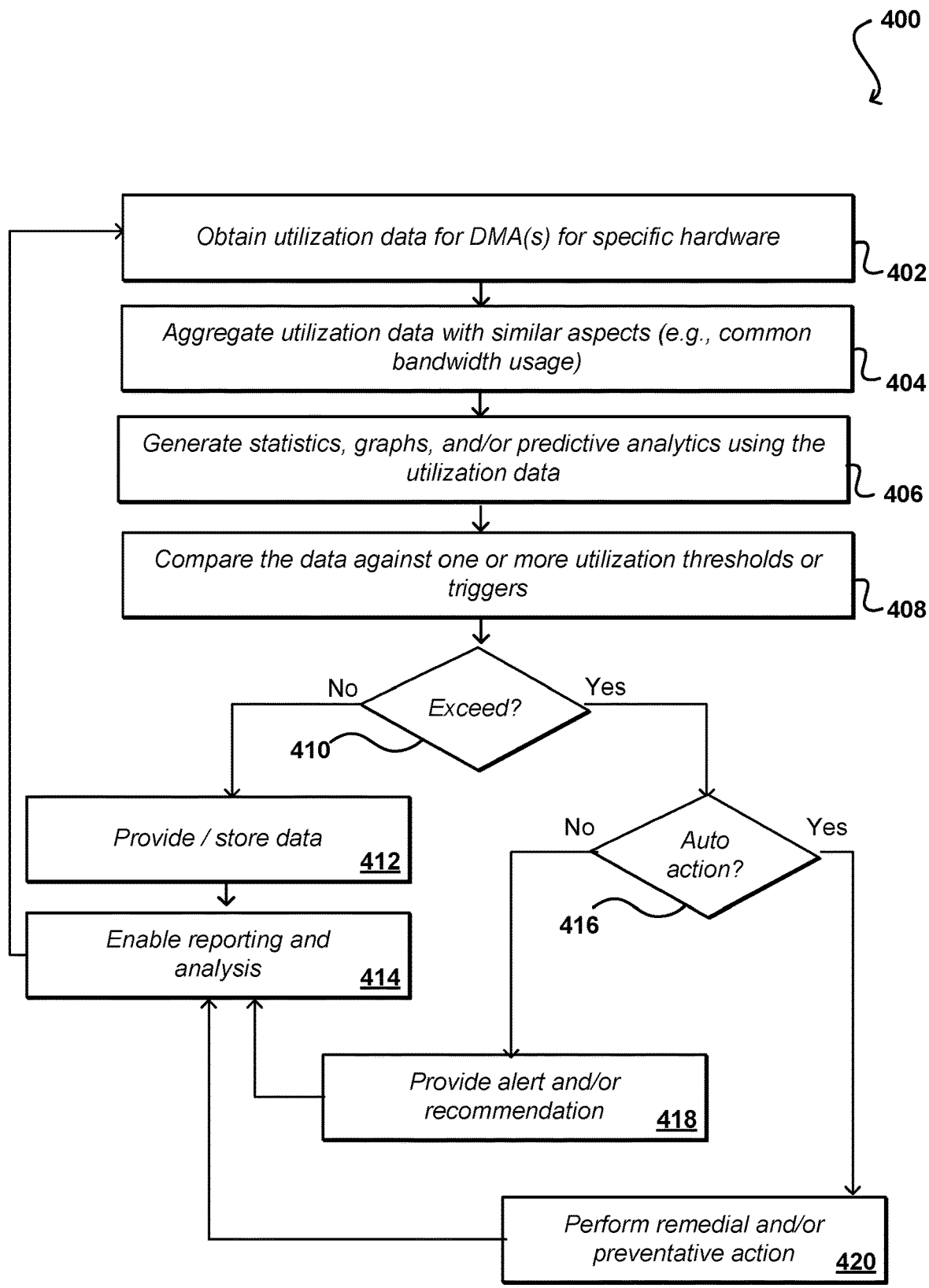
FIGS. 4A and 4B illustrate portions of an example process for debugging DMA-related operations that can be utilized in accordance with various embodiments.

FIG. 4A illustrates a portion 400 of an example process for obtaining and/or acting on DMA-related operation data that can be utilized in accordance with various embodiments. It should be understood for this and other processes discussed herein that there can be additional, alternative, or fewer steps performed in similar or alternative orders, or in parallel, within the scope of the various embodiments unless otherwise stated. Further, although DMA operations are used as an example, it should be understood that various other types of operations or functionality can benefit from aspects of the various embodiments as well, as would be apparent to one of ordinary skill in the art in light of the teachings and suggestions contained herein. In this example, utilization data can be obtained 402 for one or more DMAs relating to specific hardware. As mentioned, there may be one DMA debugger, such as a debugger daemon or tool, running on each host device, system on chip, or other such computing system or device. The utilization data may contain any appropriate utilization information as discussed and suggested herein. The utilization data can be analyzed using system-wide information, for example, to determine DMAs that may have similar aspects, such as may utilize the same bandwidth for communications or operations. At least some of the utilization data for these DMAs can be aggregated 404 over at least one common period of time, in addition to the data being kept separately in at least some embodiments. The utilization data, aggregated or otherwise, can then be used to generate 406 statistics, graphs, predictive analytics, and/or other such data that might be useful in debugging or monitoring the health of the system.

In this example, the data can be analyzed in its individual, aggregated, and/or analyzed form, and compared 408 against one or more thresholds or triggers. For example, there might be a maximum utilization threshold, or a trigger that is satisfied when an individual utilization hits a specific value, among other such options. If it is determined 410 that none of the values exceed a threshold or satisfies a trigger, then the data can be provided for analysis and/or stored 412, such as in the form of a snapshot for a specific period or point in time. The data can then be exposed to enable 414 reporting, analysis, or other such functionality. The process can continue in order to monitor the utilization over the next period. If a threshold was met or exceeded, or if a trigger was satisfied, etc., then a determination can be made 416 as to whether an action should be automatically taken. In some embodiments there are specific rules or conditions in which actions are to be taken as discussed herein. If no action is to be taken automatically, then an alert and/or recommendation can be provided 418, in addition to the data, in order to indicate to an appropriate user or entity that there is an issue, or potential issue, that may be worth investigating. If an action is to be taken, then an appropriate remedial and/or preventative action can be determined and taken 420 by the appropriate system, service, or device. As mentioned, this can include spreading or balancing the load across different hardware in order to more evenly spread DMA utilization, among other such options. The process can continue unless it is determined that the system is in a critical state in some embodiments, in which case the action may be to take one or more devices offline, etc.

Figure 4B:
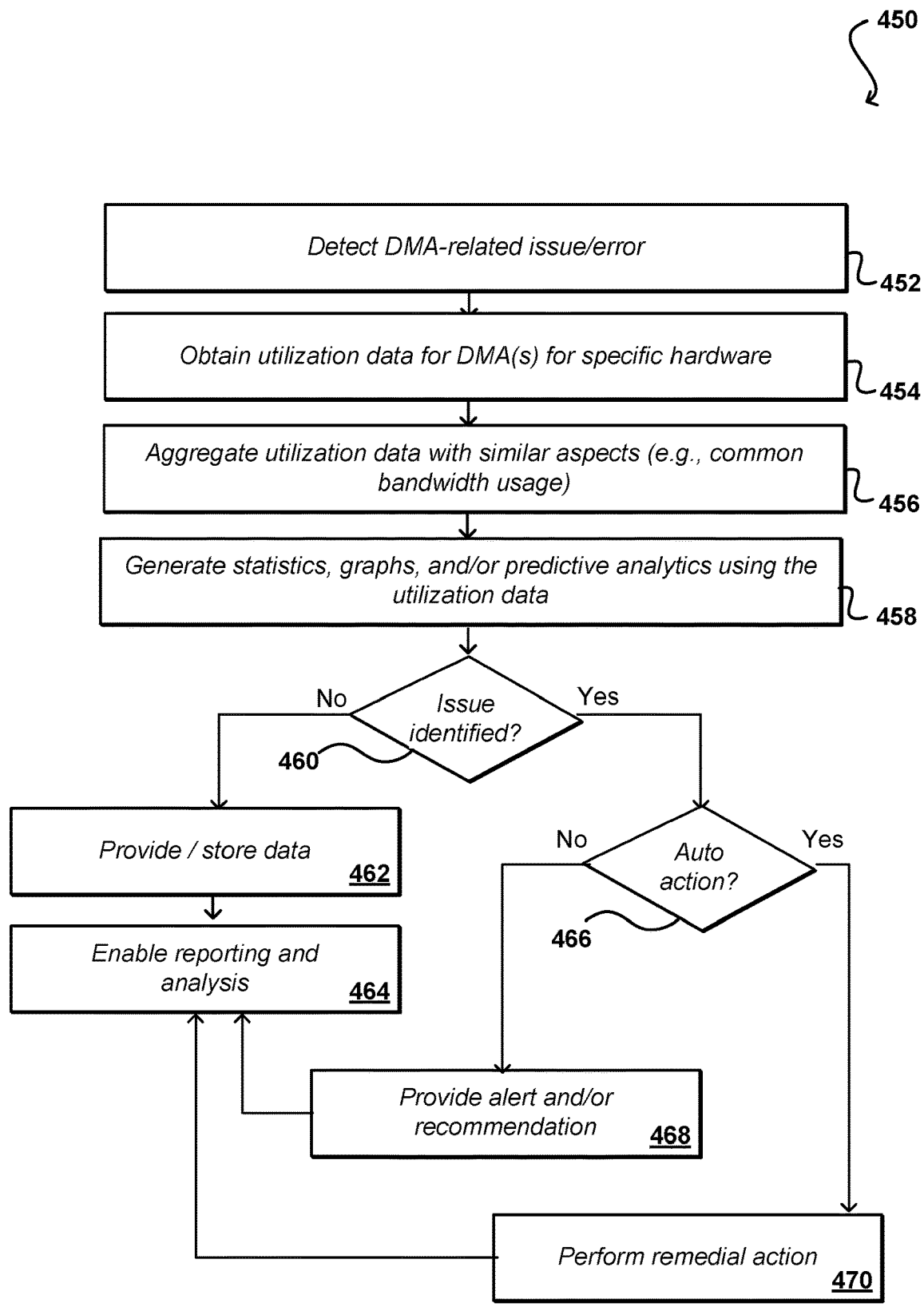

FIG. 4B illustrates another portion 450 of an example process for obtaining and/or acting on DMA-related operation data that can be utilized in accordance with various embodiments. In this example, a DMA-related issue, error, or other such occurrence is detected 452, such as by a trigger being activated or flag being raised, among other such options discussed and suggested herein. In order to attempt to debug the issue, utilization data can be obtained 454 for one or more DMAs relating to specific hardware. As mentioned, there may be one DMA debugger, such as a debugger daemon or tool, running on each host device, system on chip, or other such computing system or device. At least some of the utilization data for these DMAs can be aggregated 456 over at least one common period of time, in addition to the data being kept separately in at least some embodiments. The utilization data, aggregated or otherwise, can then be used to generate 458 statistics, graphs, predictive analytics, and/or other such data that might be useful in debugging or monitoring the health of the system.

In this example, the data can be analyzed in its individual, aggregated, and/or analyzed form and a determination made 460 as to whether the issue and/or a source of the issue has been identified. For example, a trigger that might be activated when an individual utilization hits a specific value as discussed above. If it the issue and/or source of the issue cannot be identified, at least within the system, then the data can be provided for analysis and/or stored 462, such as in the form of a snapshot for a specific period or point in time. The data can then be exposed to enable 464 reporting, analysis, or other such functionality. If the issue and/or its source can be determined, then a determination can be made 466 as to whether an action should be automatically taken. In some embodiments there are specific rules or conditions in which actions are to be taken as discussed herein. If no action is to be taken automatically, then an alert and/or recommendation can be provided 468, in addition to the data, in order to indicate to an appropriate user or entity information about the issue that may be worth investigating. If an action is to be taken, then an appropriate remedial action can be determined and taken 470 by the appropriate system, service, or device. As mentioned, this can include spreading or balancing the load across different hardware in order to more evenly spread DMA utilization, among other such options. The process can continue unless it is determined that the system is in a critical state in some embodiments, in which case the action may be to take one or more devices offline, etc.

Figure 5:
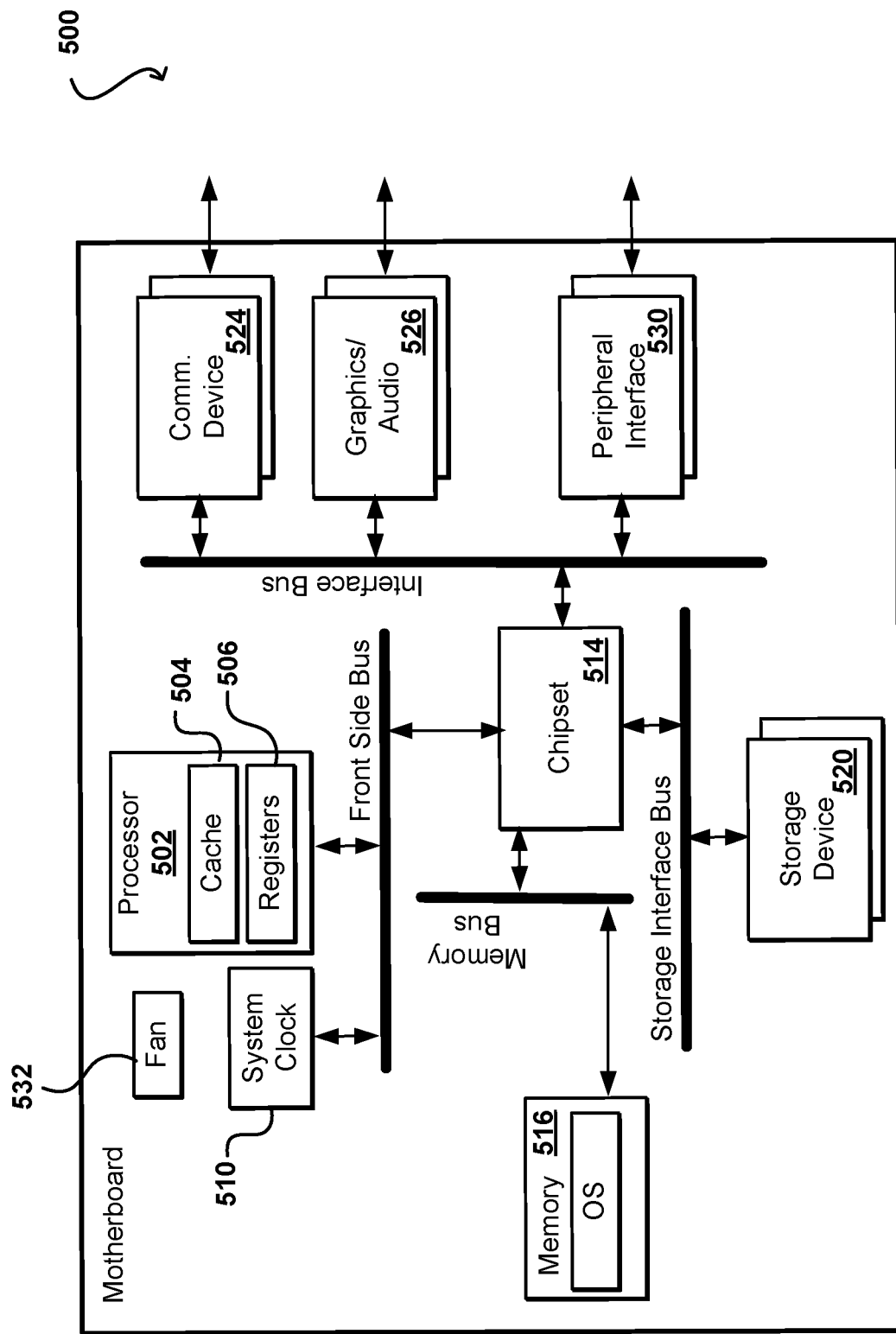
FIG. 5 illustrates components of an example computing device that can be utilized in accordance with various embodiments.

Computing resources, such as servers, that can have software and/or firmware updated in such a matter will generally include at least a set of standard components configured for general purpose operation, although various proprietary components and configurations can be used as well within the scope of the various embodiments. FIG. 5 illustrates components of an example computing device 500 that can be utilized in accordance with various embodiments. As known for computing devices, the computer will have one or more processors 502, such as central processing units (CPUs), graphics processing units (GPUs), and the like, that are electronically and/or communicatively coupled with various components using various buses, traces, and other such mechanisms. A processor 502 can include memory registers 506 and cache memory 504 for holding instructions, data, and the like. In this example, a chipset 514, which can include a northbridge and southbridge in some embodiments, can work with the various system buses to connect the processor 502 to components such as system memory 516, in the form or physical RAM or ROM, which can include the code for the operating system as well as various other instructions and data utilized for operation of the computing device. The computing device can also contain, or communicate with, one or more storage devices 520, such as hard drives, flash drives, optical storage, and the like, for persisting data and instructions similar, or in addition to, those stored in the processor and memory. The processor 502 can also communicate with various other components via the chipset 514 and an interface bus (or graphics bus, etc.), where those components can include communications devices 524 such as cellular modems or network cards, media components 526, such as graphics cards and audio components, and peripheral interfaces 530 for connecting peripheral devices, such as printers, keyboards, and the like. At least one cooling fan 532 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 502 can obtain data from physical memory 516, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 504 in at least some embodiments. The computing device 500 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 530, a communication device 524, a graphics or audio card 526, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 502 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example; the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (MC) may be implemented as an application specific integrated circuit (ASIC) comprising digital logic operable to send and receive packets.

In an illustrative embodiment; a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

Figure 6:
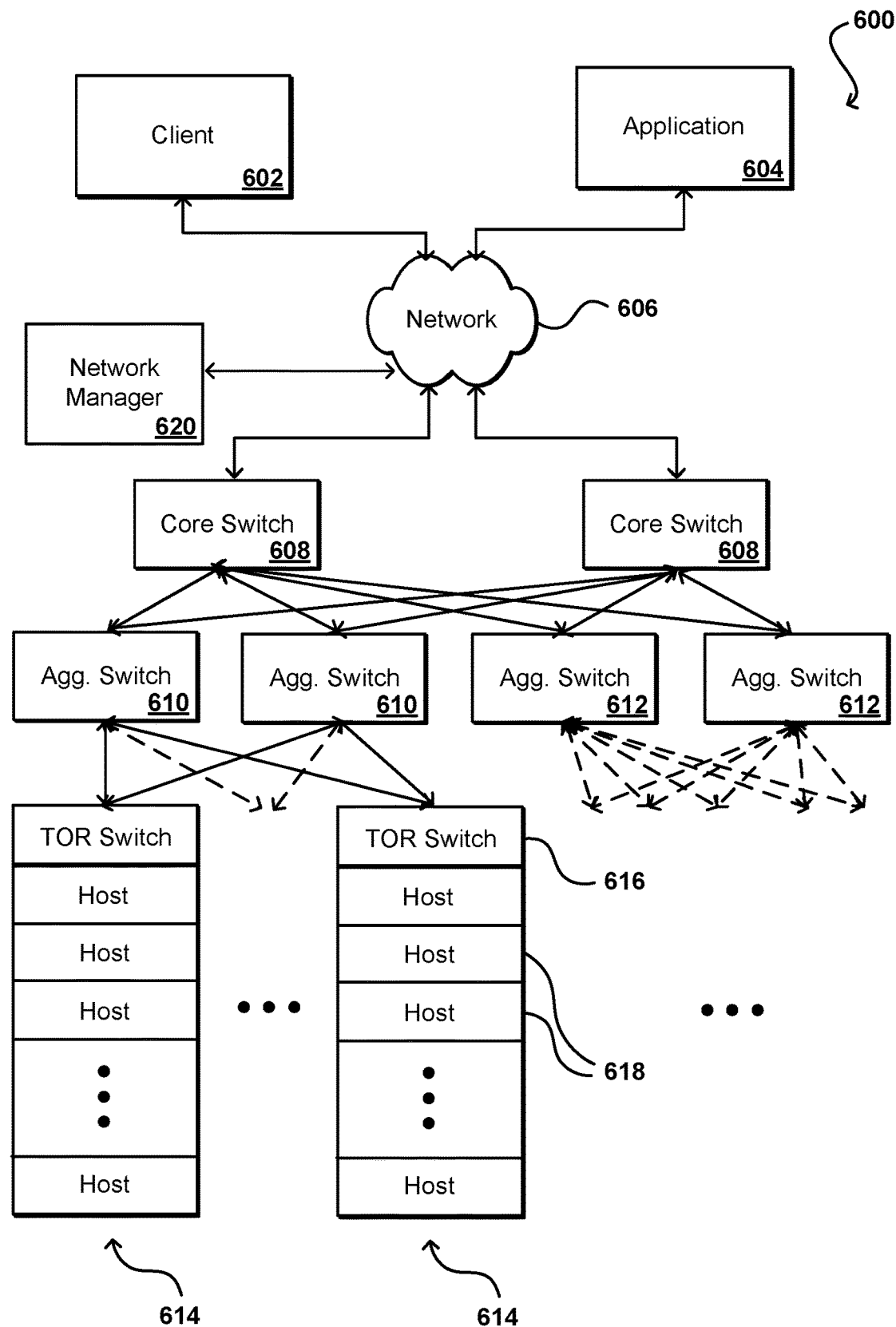
FIG. 6 illustrates components of an example environment in which aspects of the various embodiments can be implemented.

As mentioned, in many instances the live updating of BIOS for a server can occur in a shared resource environment, such as a data center or server farm. FIG. 6 illustrates an example network configuration 600 that can be used to route communications between specific host machines or other such devices in such an environment. This example shows a typical design that can be used for a data center, wherein a source such as a client device 602 or application 604 is able to send requests across at least one network 606, such as the Internet or a cellular network, to be received by one or more components of the data center. Properties of various components of the network, such as provisioned instances, etc., can be managed using at least one management system, component, or service 620. In this example, the requests are received over the network to one of a plurality of core switches 608, but it should be understood that there can be any of a number of other components between the network and the core switches as known in the art. As traditional differentiators have substantially disappeared, the terms "switch" and "router" can be used interchangeably. For purposes of clarity and explanation this document standardizes on the term "switch," but it should be understood this term as used also encompasses routers and other devices or components used for such purposes. Further, the switches can include any appropriate switch, such as a multilayer switch that operates at different levels in an OSI (Open System Interconnection) reference model.

As illustrated, each core switch 608 is able to communicate with each of a plurality of aggregation switches 610, 612, which in at least some embodiments are utilized in pairs. Utilizing aggregation switches in pairs provides a redundant capability in case one or the switches experiences a failure or is otherwise unavailable, such that the other device can route traffic for the connected devices. As can be seen, each core switch in this example is connected to each aggregation switch, such that the tiers in this example are fully connected. Each pair of aggregation switches 610, 612 is linked to a plurality of physical racks 614, each of which typically contains a top of rack (TOR) or "access" switch 616 and a plurality of physical host machines 618, such as data servers and other processing devices. As shown, each aggregation switch can be connected to a number of different racks, each with a number of host machines. For the respective portion of the network, the aggregation pairs are also fully connected to the TOR switches.

As an additional benefit, the use of aggregation switch pairs enables the capability of a link to be exceeded during peak periods, for example, wherein both aggregation switches can concurrently handle and route traffic. Each pair of aggregation switches can service a dedicated number of racks, such as one hundred twenty racks, based on factors such as capacity, number of ports, etc. There can be any appropriate number of aggregation switches in a data center, such as six aggregation pairs. The traffic from the aggregation pairs can be aggregated by the core switches, which can pass the traffic "up and out" of the data center, such as back across the network 606. In some embodiments, the core switches are provided in pairs as well, for purposes including redundancy.

In some embodiments, such as high radix interconnection networks utilized for high-performance computing (HPC) or other such purposes, each physical rack can contain multiple switches. Instead of a single physical TOR switch connecting twenty-one hosts in a rack, for example, each of three switches in the rack can act as a local TOR switch for a "logical" rack (a sub-rack of a physical rack or logical grouping of devices (hosts and/or switches) from multiple racks), with each local TOR switch connecting seven of the host machines. The logical racks can be implemented using physical or wireless switches in different embodiments. In some embodiments each of these switches within a high performance computing rack manages up to twelve servers, but the number can vary depending on factors such as the number of ports on each switch. For example, if a switch contains twenty-four ports, half of those ports typically will be host-facing and the other half will face the external network. A design in accordance with one embodiment could utilize seven racks with three switches in each, with each switch communicating (redundantly) with twelve servers, which would generally be equivalent to twenty-one separate racks each with a single TOR switch communicating with twelve servers, for example. In subsequent figures and description, it should be understood that physical or logical racks can be used within the scope of the various embodiments.

Figure 7:
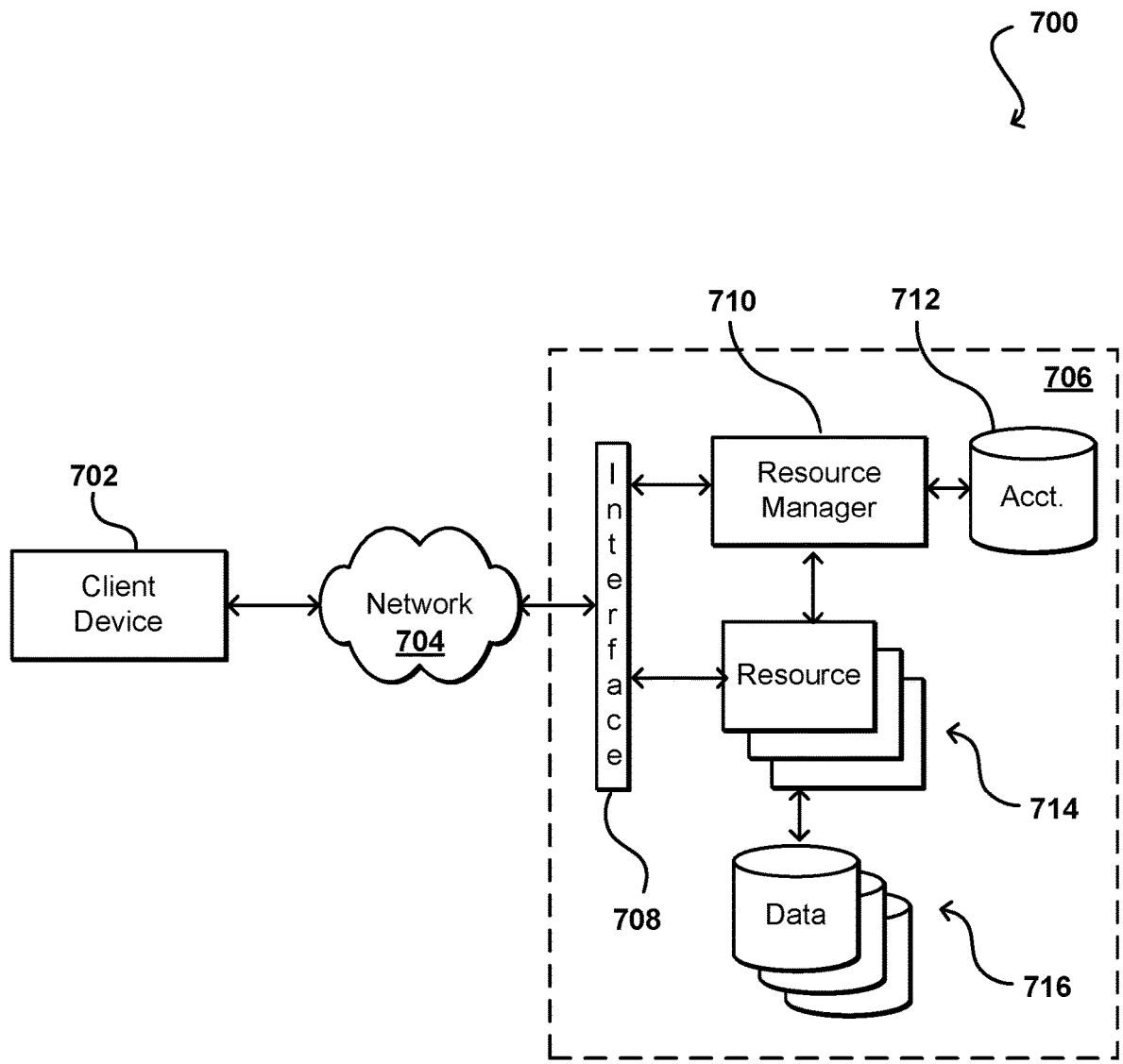
FIG. 7 illustrates components of another example environment that can be used to implement aspects of the various embodiments.

As mentioned, such a configuration can be used in some embodiments to provide resource capacity for one or more users or customers as part of a shared resource environment. FIG. 7 illustrates an example of one such environment 700 in which aspects of the various embodiments can be implemented. In this example a user is able to utilize a client device 702 to submit requests across at least one network 704 to a multi-tenant resource provider environment 706. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 704 can include any appropriate network, including an intranet, the Internet, a cellular network, a local area network (LAN), or any other such network or combination, and communication over the network can be enabled via wired and/or wireless connections. The resource provider environment 706 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 714 of one or more types. These types can include, for example, application servers operable to process instructions provided by a user or database servers operable to process data stored in one or more data stores 716 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 714 can submit a request that is received to an interface layer 708 of the provider environment 706. The interface layer can include application programming interfaces (APIs) or other exposed interfaces enabling a user to submit requests to the provider environment. The interface layer 708 in this example can also include other components as well, such as at least one Web server, routing components, load balancers, and the like. When a request to provision a resource is received to the interface layer 708, information for the request can be directed to a resource manager 710 or other such system, service, or component configured to manage user accounts and information, resource provisioning and usage, and other such aspects. A resource manager 710 receiving the request can perform tasks such as to authenticate an identity of the user submitting the request, as well as to determine whether that user has an existing account with the resource provider, where the account data may be stored in at least one data store 712 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 702 to communicate with an allocated resource without having to communicate with the resource manager 710, at least until such time as a relevant aspect of the user account changes, the user is no longer granted access to the resource, or another such aspect changes.

The resource manager 710 (or another such system or service) in this example can also function as a virtual layer of hardware and software components that handles control functions in addition to management actions, as may include provisioning, scaling, replication, etc. The resource manager can utilize dedicated APIs in the interface layer 708, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 708 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   obtaining utilization data for a plurality of Direct Memory Access (DMA) engines on a computing device;
   analyzing a set of memory mappings to determine portions of memory mapped to a plurality of hardware components on the computing device;
   aggregating the utilization data, corresponding to a portion of memory mapped to a single hardware component of the plurality of hardware components, to generate a set of aggregated utilization data;
   determining that the utilization data or the aggregated utilization data exceeds a utilization threshold; and
   performing a remedial action for the computing device.

2. The computer-implemented method of claim 1, wherein the plurality of hardware components are distributed across a set of system on chip (SoC) devices of the computing device, and wherein the utilization data is obtained using a software daemon running on the computing device or the set of SoC devices.

3. The computer-implemented method of claim 1, further comprising:
   generating a snapshot including the utilization data and the aggregated utilization data; and
   storing the snapshot with a series of snapshots, the series of snapshots indicating changes in the utilization over time.

4. The computer-implemented method of claim 1, wherein the remedial action includes displaying graphs of the utilization data and the aggregated utilization data through a user interface, generating an alert, causing a recommendation to be presented through the user interface, or automatically adjusting an operating parameter of the computing device.

5. The computer-implemented method of claim 1, wherein the remedial action comprises adjusting a distribution of workload across at least a subset of the plurality of DMA engines.

6. A computer-implemented method, comprising:
   obtaining, over a period of time, utilization data for a plurality of Direct Memory Access (DMA) components on a computing device;
   aggregating the utilization data, corresponding to a portion of memory mapped to a single hardware component of a plurality of hardware components associated with the computing device, for at least two of the DMA components;
   providing, for display, information about the utilization data or the aggregated utilization data over the period of time; and
   causing a snapshot to be stored to persistent memory, the snapshot including the utilization data or the aggregated utilization data for the period of time.

7. The computer-implemented method of claim 6, further comprising:
   obtaining the utilization data using a software daemon executing in the background on the computing device, the software daemon executing on the computing device or a system on chip (SoC) installed on the computing device.

8. The computer-implemented method of claim 6, wherein:
   the DMA components are installed on the computing device or a set of SoC devices installed on the computing device.

9. The computer-implemented method of claim 8, further comprising:
   analyzing a set of memory mappings to determine portions of memory mapped to the plurality of hardware components on the computing device.

10. The computer-implemented method of claim 6, further comprising:
    determining, using the utilization data and the aggregated utilization data, that a utilization threshold is exceeded or a trigger is satisfied; and
    causing a remedial action to be performed with respect to the computing device.

11. The computer-implemented method of claim 10, wherein the remedial action includes displaying graphs of the utilization data and the aggregated utilization data through a user interface, generating an alert, causing a recommendation to be presented through the user interface, or automatically adjusting an operating parameter of the computing device.

12. The computer-implemented method of claim 6, further comprising:
    determining that current data is inaccessible on the computing device; and
    accessing the snapshot from a series of snapshots to attempt to determine a cause for the current data being inaccessible.

13. The computer-implemented method of claim 6, further comprising:
    determining a DMA-related issue with respect to the computing device; and
    providing the information about the utilization data through a debugging interface and indicating a location or source of a potential issue on the computing device determined using the utilization data.

14. The computer-implemented method of claim 6, wherein the DMA components facilitate communication to a hardware accelerator, a compression engine, an encryption engine, a storage engine, or a DMA-capable input-output (I/O) device.

15. The computer-implemented method of claim 6, further comprising:
- adjusting an amount of work assigned to the DMA components based on an analysis of the utilization data.

16. A system, comprising:
- a processor;
- a system on chip (SoC) device including a plurality of DMA components; and
- memory including instructions that, when executed by the processor, cause the system to:
  - obtain, over a period of time, utilization data for the plurality of DMA components;
  - aggregate the utilization data, corresponding to a portion of memory mapped to a single hardware component of a plurality hardware components associated with the system, for at least two of the DMA components;
  - provide, for display, information about the utilization data or the aggregated utilization data over the period of time; and
  - cause a snapshot to be stored to persistent memory, the snapshot including the utilization data or the aggregated utilization data for the period of time.

17. The system of claim 16, wherein the instructions when executed further cause the system to:
- obtain the utilization data using a software daemon, the software daemon executing on the processor or a second processor of the SoC device.

18. The system of claim 16, wherein the instructions when executed further cause the system to:
- analyze a set of memory mappings to determine portions of memory mapped to the plurality of hardware components associated with the system.

19. The system of claim 16, wherein the instructions when executed further cause the system to:
- determine that a utilization threshold is exceeded or a debugging trigger is activated; and
- cause a remedial action to be performed with respect to the system.

20. The system of claim 16, wherein the instructions when executed further cause the system to:
- adjust an amount of work assigned to the DMA components based on an analysis of the utilization data.

* * * * *